US012792457B2

(12) United States Patent
Burich

(10) Patent No.: US 12,792,457 B2
(45) Date of Patent: Nov. 10, 2026

(54) BIT-SHAPING VIA LINEAR BLOCK CODES

(71) Applicant: MICRON TECHNOLOGY, INC., Boise, ID (US)

(72) Inventor: Mariano Burich, San Diego, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/928,804

(22) Filed: Oct. 28, 2024

(65) Prior Publication Data

US 2026/0119311 A1 Apr. 30, 2026

(51) Int. Cl.
*G06F 11/00* (2006.01)
*G06F 11/10* (2006.01)

(52) U.S. Cl.
CPC ................................ *G06F 11/1004* (2013.01)

(58) Field of Classification Search
CPC .. G06F 11/1004; G06F 11/10; G06F 11/1012; G06F 11/102; G06F 11/1048
See application file for complete search history.

(56) References Cited

U.S. PATENT DOCUMENTS 9,524,794 B1 * 12/2016 Shapira ................ G11C 16/349
2014/0143631 A1 * 5/2014 Varanasi ............. G11C 11/5628 714/763
2015/0324148 A1 * 11/2015 Achtenberg .......... G06F 3/0679 711/103
2021/0373993 A1 * 12/2021 Sharon ............... G11C 16/0483
2024/0204799 A1 * 6/2024 Chung ................. H03M 13/114

* cited by examiner

*Primary Examiner* — Joseph D Manoskey
(74) *Attorney, Agent, or Firm* — Lowenstein Sandler LLP

(57) ABSTRACT

An example includes a method for bit-shaping data of a codeword for a memory device. The method includes flipping bits in one or more data windows of the codeword to provide one or more respective flipped data windows based on a shaping criterion to shape the codeword via a controller. The method also includes generating a flip indicator bit via the controller to indicate each of the one or more flipped data windows of the shaped codeword. The method also includes appending the flip indicator bit for each of the one or more flipped data windows to the shaped codeword via the controller. The method further includes storing the shaped codeword with the appended flip indicator bit for each of the one or more flipped data windows in the memory device via the controller in a data write operation.

14 Claims, 7 Drawing Sheets

BIT-SHAPING VIA LINEAR BLOCK CODES

TECHNICAL FIELD

This disclosure relates to memory devices, and particularly to bit-shaping via linear block codes.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells. However, for certain types of memory cells (e.g., in a flash memory), the longer the duration of time that memory cells store data, the more the memory cells experience charge loss that can affect the read characteristics of the memory cell.

DETAILED DESCRIPTION

Figure 1A:
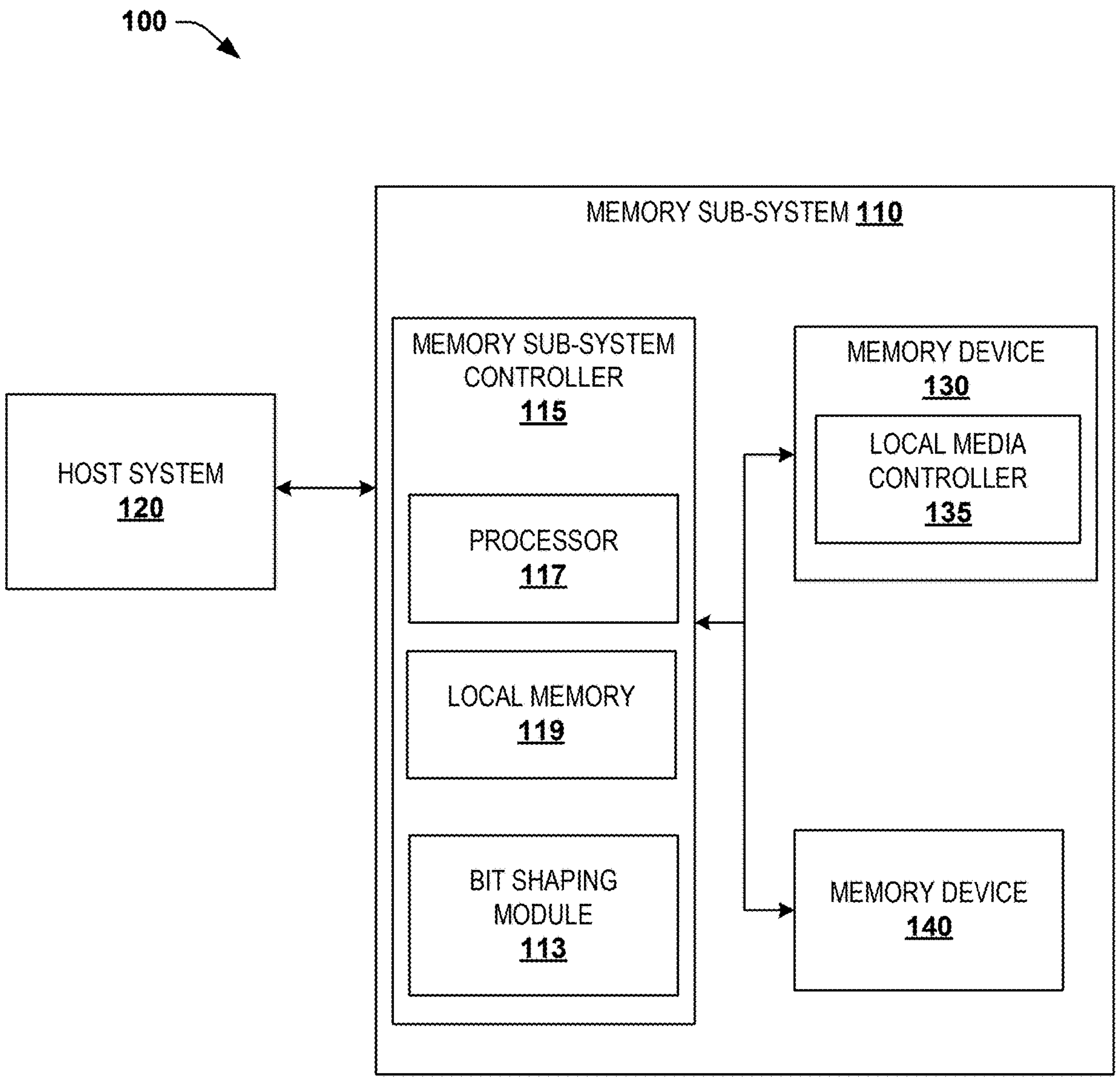
FIG. 1A illustrates a system for encoding/decoding data from a memory sub-system.

This disclosure relates to memory devices, and particularly to bit-shaping via linear block error-correcting codes. A manner for shaping bits of a codeword is described herein, such as for shaping parity bits after encoding a codeword. As described herein, to shape a codeword, data (e.g., user data and/or parity data) can be shaped by implementing a bit-shaping algorithm that can flip bits based on one or more bit-shaping criteria. As described herein, the term "bit-flipping" or "flip" with respect to bits describes inverting the logic values of the bits. Shaped user data can be encoded in any of a variety of ways to generate a codeword with shaped bits on the user data portion. During the encoding process, parity data is generated for and appended to the user data to facilitate decoding of the codeword using any of a variety of decoding processes (e.g., low density parity check (LDPC) decoding). However, since parity bits are generated subsequent to user data shaping and encoding processes, parity data is not shaped in the same manner as the user data.

For example, every time a physical block of memory is read, a high amplitude read voltage pulse is applied to the physical block. Over a large quantity of read operations, the high amplitude read pulses can result in read disturb (RD) stress and read disturb charge loss (RDCL), each of which can deleteriously affect read performances of the memory cells. For example, RD stress can alter the voltage thresholds of a memory cells (e.g., particularly at level zero), thereby resulting in a greater error rate in the data that is read from the memory cells. As another example, RDCL can result in distortion and decrease of charge distributions of voltage thresholds at higher voltage levels (e.g., level fifteen of a sixteen level codeword).

One manner of mitigating the deleterious effects of RD stress and/or RDCL is to provide bit shaping of codewords. As described herein, the term "bit-shaping" refers to a change in the quantity of memory cells in different voltage levels of a given codeword. For example, by decreasing the quantity of memory cells in the lowest one or more voltage levels and the highest one or more voltage levels, and by correspondingly increasing the quantity of the memory cells in the remaining voltage levels, the codeword can be shaped to provide resilience to the effects of RD stress and/or RDCL. The data of a codeword can be shaped based on implementing a variety of bit-shaping criteria before encoding the data. However, because parity data is generated in response to a data encoding process, the parity data is not also subject to the bit-shaping criteria, and is thus not shaped in the same manner as the data encoded therein.

To generate a shaped codeword in which the parity data is likewise shaped, the bit-shaping algorithm described herein facilitates a bit-shaping algorithm on the parity data (e.g., similar to or the same as the bit-shaping algorithm provided on user data before encoding) to flip bits of the parity data based on a parity-shaping criterion. The bit-shaping algorithm can generate flip indicator data that can be appended to the shaped codeword, with the flip indicator data providing an indication of which portion of the parity data, or "windows" of the parity data, were flipped by the bit-shaping algorithm. Thus, the shaped codeword can include shaped user data, protected user flip indicators, the shaped parity data, and the unprotected parity flip indicators.

Additionally, a decoder module can generate flip decode data for each of the windows of the parity data that was flipped, as indicated by the flip indicator data. For example, the flip indicator data can correspond to a single asserted (e.g., logic-1) bit that corresponds to a respective one of the flipped windows of the parity data. The decoder module can be configured to maintain a linear block code matrix (e.g., H-matrix), that through an encoding process generates a shaped codeword from the shaped user data, and is implemented for subsequent decoding of the shaped codeword. The linear block code matrix can include portions (e.g., arranged as columns) that likewise correspond to the flipped windows of the shaped codeword, such as parity portions of the linear block code matrix that correspond to the flip windows of the parity data of the shaped codeword. The decode matrix can thus generate the flip decode data from the portions of the linear block code matrix that correspond to the flipped windows of the shaped codeword to protect the flip indicator data from bit-errors. For example, the flip decode data can be generated as a column that can be appended to the linear block code matrix, with each row being a single-bit value that is an output of a logic-XOR of each column of the respective portion of the linear block code matrix corresponding to the respective flipped window of the shaped codeword. Due to the flip decode data construction, it is able to automatically protect its associated parity bit flip indicator. Since each flip decode data is the logic-XOR of columns in a flip window of the linear block code matrix, all parity bit flip indicators are thus protected and become part of the shaped codeword.

The shaped codeword (e.g., including the associated flip indicators) can thus be stored in a memory device (e.g., a NAND device). After the shaped codeword is read from the memory device, the shaped codeword can be decoded with traditional methods. The decoding is possible because the shaped codeword is a part of the linear block code codebook. To recover the user data, the decoder can un-flip each of the windows of the user data of the corrected shaped codeword based on the user flip indicators.

A memory sub-system refers to a storage device, a memory module or some combination thereof. The memory sub-system includes a memory device or multiple memory devices that store data. The memory devices could be volatile or non-volatile memory devices. Some examples of a memory sub-system include high density non-volatile memory devices where retention of data is desired during intervals of time where no power is supplied to the memory device. One example of a non-volatile memory device is a not-AND (NAND) memory device. A non-volatile memory device is a package that includes a die(s). Each such die can include a plane(s). For some types of non-volatile memory devices (e.g., NAND memory devices), each plane includes a set of physical blocks, and each physical block includes a set of pages. Each page includes a set of memory cells, which are commonly referred to as cells. A cell is an electronic circuit that stores information. A cell stores one or more bits of binary information and has various logic states that correlate to the number of bits being stored. The logic states are be represented by binary values, such as '0' and '1', or as combinations of such values, such as '00', '01', '10' and '11'.

A memory device includes multiple cells arranged in a two-dimensional or a three-dimensional array. In some examples, memory cells are formed on a silicon wafer in an array of columns connected by conductive lines (also referred to as bitlines, or BLs) and rows connected by conductive lines (also referred to as wordlines or WLs). A wordline is a row of associated memory cells in a memory device that are used with a bitline or multiple bitlines to generate the address of each of the memory cells. The intersection of a bitline and a wordline defines an address of a given memory cell.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory devices.

The memory sub-system controller is configured/programmed to encode the host and other data, as part of a write operation, into a format for storage at the memory device(s). Encoding refers to a process of generating parity bits from embedded data (e.g., a sequence of binary bits) using an ECC and combining the parity bits to the embedded data to generate a codeword that is written to a memory device in a data write operation. Additionally, the memory sub-system controller can decode codewords, as part of a read operation, stored at the memory device(s) of the memory sub-system. Decoding refers to a process of reconstructing the original embedded data (e.g., sequence of binary bits) from the codeword (e.g., the encoded original embedded data) received from storage at the memory device(s). As an example, the decoding process can include an error correction code (ECC) to identify and correct errors in the data when the data is decoded.

For example, data strings can be encoded by an ECC encoder by adding a number of redundant and/or parity bits to create corresponding codewords. When an original data string is to be retrieved from the memory, an ECC decoder can use the corresponding codewords to identify bit errors in the encoded data string. If bit errors are present, one or more ECC operations can be employed to correct the bit errors and to recover the original data string. In addition to outputting error-checked and/or error-corrected data, some implementations of the ECC can also generate metadata regarding an ECC decode operation.

One example of decoding utilizes a low density parity check (LDPC) decoding process. LDPC decoding refers to a decoding method that utilizes the LDPC code to reconstruct the original embedded data. As example, an LDPC code is defined by, among other things, a sparse parity-check matrix, alternatively referred to as an H-matrix, denoted as H. Each row of the H-matrix embodies a linear constraint imposed on a designated subset of data bits. Entries within the H-matrix, either '0' or '1', signify the participation of individual data bits in each constraint. Stated differently, each row of the H-matrix represents a parity-check equation, and each column corresponds to a bit in the codeword. During encoding, the embedded data is multiplied by the generator matrix, which is the inverse of the H-matrix associated with a chosen LDPC code, to generate parity bits. The generated parity bits are appended to the embedded data to generate an LDPC codeword. The LDPC codeword includes the embedded data and the parity bits, allowing for identification and rectification of errors. The LDPC codeword is storable at the memory device(s) of the memory sub-system.

Initially, during LDPC decoding, the LDPC codeword is compared with the expected relationships encoded in the H-matrix. In particular, the LDPC codeword is multiplied by a transpose of the H-matrix associated with the LDPC code used to encode the LDPC codeword. This operation can also be performed without making a matrix multiplication by sequentially checking each parity using XOR operations. The result of the multiplication produces a vector (e.g., a syndrome vector), in which each element corresponds to a specific parity-check equation in the sparse parity-check matrix. The number of non-zero entries in the syndrome vector corresponds to the non-satisfied (e.g., failed) parity checks, and the number of non-satisfied parity checks is the syndrome weight. A syndrome vector with zero values signifies that the corresponding parity-check equation is satisfied (e.g., no errors or having even number of bit errors in the parity check equation), and a syndrome vector with non-zero values indicates potential errors impacting the bits involved in the corresponding parity-check equation. Potential errors, for example, may be due to the bits involved in the corresponding parity-check equation being flipped due to noise, interference, distortion, bit synchronization errors or errors from the media itself (both intrinsic and extrinsic). For example, a bit that may have originally been stored as a '0' may be flipped to a '1' or vice versa.

As described above, bit shaping of codewords can mitigate the deleterious effects of RD stress and/or RDCL. One manner of providing bit shaping is to flip groups of bits of the data (e.g., with such groups described as "windows") that satisfy a bit-shaping criterion. For example, a given codeword can be shaped by encoding the codeword to have fewer logic-1 values than logic-0 values. A bit-shaping algorithm can thus be implemented to evaluate each of the windows of the data and to flip the bits of the window if the window satisfies a bit-shaping criterion of having more logic-1 values than logic-0 values (or any other criterion). The flipping of the windows can be identified by flip indicator data that can provide information as to which of the windows have been flipped prior to the encoding process for shaping the codeword. The flip indicator data can likewise be encoded as part of the shaped codeword. But because parity data is generated by the encoding process subsequent to the bit-shaping algorithm, parity data is not shaped after the shaped data is encoded.

As described herein, the parity data that is generated for shaped encoded data can also be shaped to provide for a shaped codeword that can be more resilient to the effects of RD stress and/or RDCL. After the shaped data is encoded, the parity data can be similarly shaped by the bit-shaping algorithm. The bit-shaping algorithm can evaluate the parity bits of each of a set of windows of the parity data to determine if the parity bits satisfy a bit-shaping criterion. For example, the bit-shaping criterion for shaping bits of the codeword after encoding the user data (e.g., including parity data) can be the same as or similar to the bit-shaping criterion that is implemented to shape the user data prior to encoding. Thus, in response to determining if the windows of the parity bits satisfy the bit-shaping criterion, the bit-shaping algorithm can flip the windows of the parity bits. In response to flipping all of the columns that satisfy the bit-shaping criterion, the parity data can likewise be shaped and appended to the shaped data to provide a shaped codeword. In addition, the bit-shaping algorithm can generate flip indicator data that can likewise be appended to the shaped codeword, and can thus be indicative of which of the windows of data of the codeword were flipped to shape the codeword. The shaped codeword can thus be saved to the memory device, and can be more resilient to the effects of RD stress and/or RDCL relative to unshaped codewords (e.g., having uniform voltage levels).

After the shaped codeword is read from the memory device, the shaped codeword can be decoded directly via a decoding algorithm (e.g., LDPC decoding). The decoding is possible because the shaped codeword is a part of the linear block code codebook. To recover the user data, the decoder can un-flip each of the windows of the user data of the corrected shaped codeword based on the user flip indicators.

While the description herein is directed primarily to shaping parity bits subsequent to encoding the user data, any encoded data of the codeword can be further shaped by the bit-shaping algorithm and bit-flipping operations and recovery described herein. For example, portions of the encoded user data of the codeword can also be flipped and indicated by the flip indicator data alternatively or in addition to the flipping of the parity data of the codeword. Therefore, the description herein is not limited to flipping parity bits to provide further bit-shaping of a codeword subsequent to encoding.

FIG. 1A illustrates a system 100 that includes a memory sub-system 110 that can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1A illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-transitory computer readable media. The memory device 130 and the memory device 140 can include any combination of the different types of non-volatile memory devices and/or volatile memory devices. The volatile memory devices (e.g., the memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) or higher, can store multiple bits per cell. In some examples, each of the memory device(s) 130 can include one or more arrays of memory cells such as SLCs, MLCs, TLCs, QLCs, PLCs or some combination thereof. In some examples, a particular memory device can include an SLC portion, an MLC portion, a TLC portion, a QLC portion and/or a PLC portion of memory cells. The memory cells of the memory device(s) 130 can be grouped as pages that can refer to a logical unit of the memory device used to store data. In some types of memory (e.g., NAND), pages can be grouped to form blocks 106. The blocks 106 can include sub-blocks, and can be organized across a set of planes of the memory device 130.

As an example, a block (sometime referred to herein as "physical block") 106 of the memory device 130 according to the present disclosure has at least two decks. A functional deck refers to a deck that satisfies criteria pertaining to a functionality of the deck. For example, the criteria can include that a metric of the deck (e.g., an average RBER) does not exceed a threshold value that is considered as an indication of a normal function of the deck. A defective deck refers to a deck that does not satisfy the criteria pertaining to the functionality of the deck. For example, the metric of the deck (e.g., an average RBER) does not exceed a threshold value that is considered as an indication of a normal function of the deck. The criteria used for the functional deck and the defective deck can be the same or different. In some implementations, a defective deck may be identified by program status failure.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), etc.

A memory sub-system controller 115 (or controller 115 for simplicity) communicates with the memory device(s) 130 to perform operations such as reading data, writing data or erasing data at the memory device(s) 130 and other such operations. The memory sub-system controller 115 can include hardware such as one or more integrated circuits and/or discrete components, a buffer memory or some combination thereof. The hardware can include a digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or another suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory device(s) 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some examples, the memory device(s) 130 include local media controllers 135 that operate in concert with the memory sub-system controller 115 to execute operations on one or more memory cells of the memory device(s) 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

In operation, the host system 120 manages and controls the flow of data between itself and the memory sub-system 110, ensuring efficient data storage and retrieval operations. More generally, the host system 120 employs the memory sub-system 110 to write data to and read data from the memory sub-system 110. For instance, the host system 120 processes these request for reading and/or write data by interacting with the memory sub-system 110, managing the flow of data to and from the memory device 130 and/or the memory device 140 within the memory sub-system 110. This reading and writing of data enables operation of computing systems where data access and management is needed.

In various examples, the memory sub-system 110 includes a bit-shaping module 113 that can be configured to implement a data shaping algorithm. As an example, the data shaping algorithm can include a parity shaping algorithm. In some examples, the memory sub-system controller 115 includes at least a portion of the bit-shaping module 113. In some examples, the bit-shaping module 113 is part of the host system 120, an application or an operating system. In other examples, local media controller 135 includes a portion of the bit-shaping module 113 and is configured to perform the functionality described herein.

As described herein, the bit-shaping module 113 can provide data shaping of the codeword to generate a shaped codeword that can be more resilient to the effects of RD stress and/or RDCL. As an example, the bit-shaping module 113 can implement a bit-shaping algorithm on the user data that is to be encoded to shape the user data. The shaped user data can then be encoded to generate parity bits. The bit-shaping module 113 can then shape the parity data, such that the shaped parity data can be added or appended to the shaped user data to provide a shaped codeword that can be stored in the memory device 130. The bit-shaping algorithm module 113 can also generate flip indicator data that is indicative of the bit-flipping that was implemented to perform the bit-shaping of the parity data. The flip indicator data can thus be added or appended to the shaped codeword to remove the bit-shaping of the shaped codeword prior to decoding the codeword.

The bit-shaping module 113 can also determine the validity of the flip indicator data, such that any bit-errors in the flip indicator data can be resolved. The valid flip indicator data can thus be implemented to decode the codeword in a typical decoding process to provide the shaped user data. The shaped user data can then be un-flipped based on user data flip indicators to recover the user data.

Figure 1B:
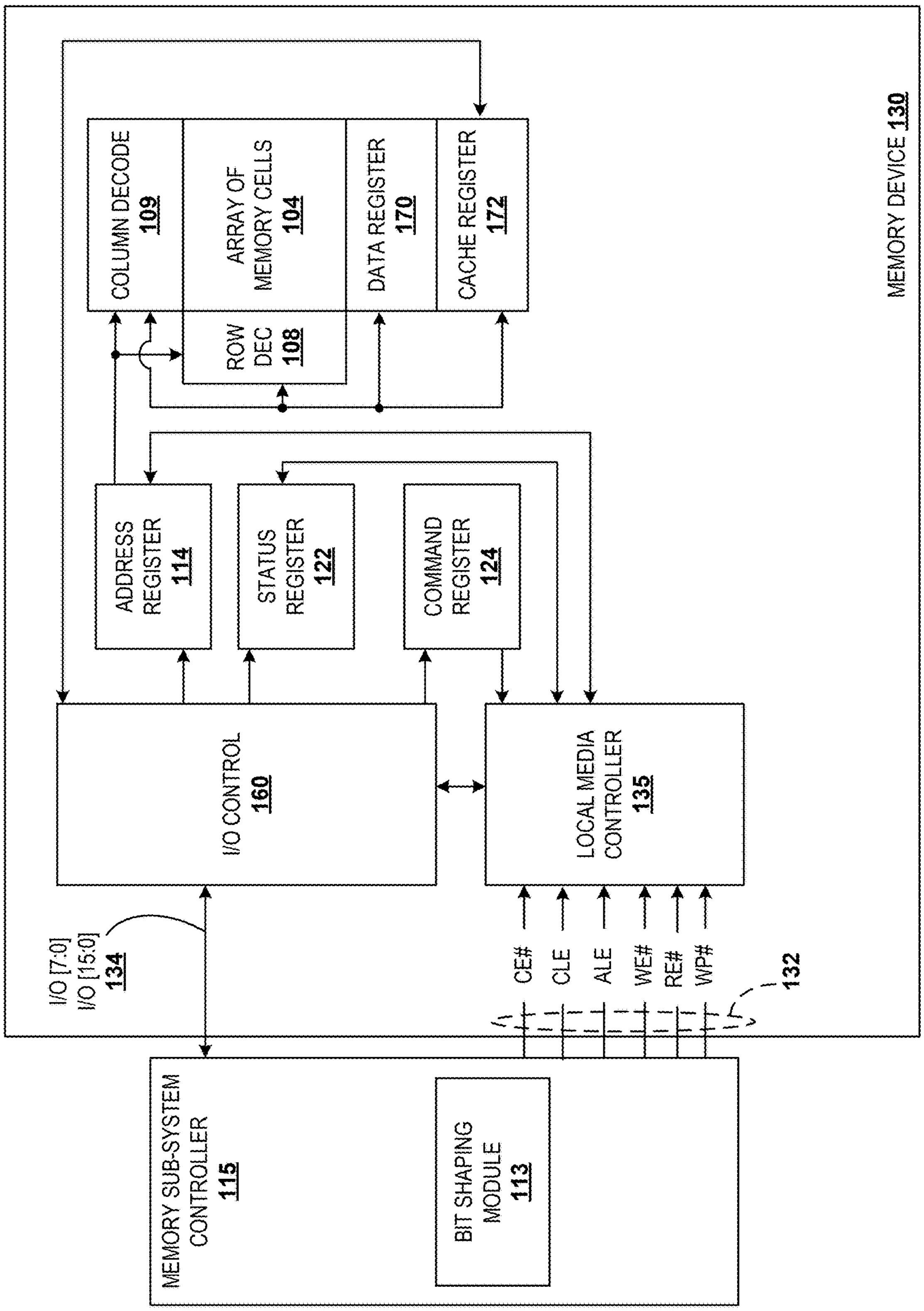
FIG. 1B illustrates a simplified block diagram of an example memory device in communication with a memory sub-system controller.

FIG. 1B illustrates a simplified block diagram of an example of a first apparatus, in the form of a memory device 130, in communication with an example of a second apparatus, in the form of a memory sub-system controller 115 of a memory sub-system (e.g., the memory sub-system 110 of FIG. 1A). Some examples of electronic systems include personal computers, personal digital assistants (PDAs), digital cameras, digital media players, digital recorders, games, appliances, vehicles, wireless devices, mobile telephones, etc. The memory sub-system controller 115 (e.g., a controller external to the memory device 130), can be a memory controller or other external host device.

The memory device 130 includes an array of memory cells 104 logically arranged in rows and columns. As an example, the memory cells 104 can be arranged in an assortment of multiple blocks, with each block including a set of sub-blocks. The blocks/sub-blocks are grouped together to form the planes of the memory device 130. The memory cells 104 form a non-transitory computer-readable medium. Memory cells of a logical row are connected to the same access line (e.g., a wordline) while memory cells of a logical column are selectively connected to the same data line (e.g., a bit line) in some examples. In some examples, a single access line is associated with more than one logical row of memory cells and a single data line may be associated with more than one logical column. Memory cells of at least a portion of the array of memory cells 104 are capable of being programmed to one of at least two target data states.

The memory device 130 includes row decode circuitry 108 and column decode circuitry 109 for decoding address signals. Address signals are received and decoded to access an array of memory cells 104 of the memory device 130. The memory device 130 also includes input/output (I/O) control circuitry 160 to manage input of commands, addresses and data to the memory device 130 as well as output of data and status information from the memory device 130. The memory device 130 has an address register 114 and is in communication with the I/O control circuitry 160, the row decode circuitry 108 and the column decode circuitry 109 to latch the address signals prior to decoding. The memory device 130 also includes a command register 124 in communication with the I/O control circuitry 160 and a local media controller 135 to latch incoming commands.

A controller (e.g., the local media controller 135 internal to the memory device 130) controls access to the array of memory cells 104 in response to the commands and generates status information for the external memory sub-system controller 115. For example, the local media controller 135 is configured to perform access operations (e.g., read operations, programming operations and/or erase operations) on the array of memory cells 104. The local media controller 135 is in communication with the row decode circuitry 108 and the column decode circuitry 109 to control the row decode circuitry 108 and the column decode circuitry 109 in response to the addresses.

As described above in the example of FIG. 1A, the bit-shaping module 113 can be configured to shape a codeword to provide resiliency against the effects of RD stress and RDCL. The bit-shaping module 113 can implement a bit-shaping algorithm on the user data by flipping windows of bits that satisfy one or more bit-shaping criteria prior to encoding the data. The encoded shaped data can thus include parity bits which can be shaped by the bit-shaping module 113 subsequent to encoding to provide a shaped codeword that includes the shaped data and the shaped parity data. The bit-shaping module 113 can also recover the parity data from the shaped parity data to facilitate decoding of the shaped user data.

The local media controller 135 is also in communication with a cache register 172. The cache register 172 latches data, either incoming or outgoing, as directed by the local media controller 135 to temporarily store data while the array of memory cells 104 is busy writing or reading, respectively, other data. During a programming operation (e.g., write operation), data is passable from the cache register 172 to the data register 170 for transfer to the array of memory cells 104, and new data can be latched in the cache register 172 from the I/O control circuitry 160. During a read operation, data is passable from the cache register 172 to the I/O control circuitry 160 for output to the memory sub-system controller 115. New data is passable from the data register 170 to the cache register 172. The cache register 172 and/or the data register 170 form (e.g., or form a portion of) a page buffer of the memory device 130. The page buffer includes sensing devices (not shown in FIG. 1B) to sense a data state of a memory cell of the array of memory cells 104. For example, the sensing devices sense a state of a data line connected to that memory cell. The memory device 130 also includes a status register 122 in communication with the I/O control circuitry 160 and the local media controller 135 to latch the status information for output to the memory sub-system controller 115.

The memory device 130 receives control signals at the memory sub-system controller 115 from the local media controller 135 over a control link 132. For example, the control signals can include a chip enable signal CE#, a command latch enable signal CLE, an address latch enable signal ALE, a write enable signal WE#, a read enable signal RE# and/or a write protect signal WP#. Additional or alternative control signals (not shown) can be further received over control link 132 depending upon the nature of the memory device 130. In some examples, the memory device 130 receives command signals (which represent commands), address signals (which represent addresses) and data signals (which represent data) from the memory sub-system controller 115 over a multiplexed input/output (I/O) bus 134 and outputs data to the memory sub-system controller 115 over the I/O bus 134.

In some examples, the commands are received over input/output (I/O) pins [7:0] of the I/O bus 134 at I/O control circuitry 160 and may then be written into the command register 124. The addresses are received over input/output (I/O) pins [7:0] of the I/O bus 134 at I/O control circuitry 160 and written into the address register 114. The data is receivable over input/output (I/O) pins [7:0] for an 8-bit device or input/output (I/O) pins [15:0] for a 16-bit device at I/O control circuitry 160 and is writable into the cache register 172. The data is subsequently written into the data register 170 for programming the array of memory cells 104 in some examples.

In some examples, the cache register 172 is omitted, and in such examples, the data is written directly into the data register 170. Additionally or alternatively, data is output over input/output (I/O) pins [7:0] for an 8-bit device or input/output (I/O) pins [15:0] for a 16-bit device. Moreover, it is noted that although reference is made to I/O pins, in other examples, a different conductive node providing for electrical connection to the memory device 130 by an external device (e.g., the memory sub-system controller 115), such as conductive pads or conductive bumps could be used in addition to or as a replacement for the I/O pins.

The example memory device 130 of FIG. 1B has been simplified. Moreover, in other examples, the functionality of the various block components described with reference to FIG. 1B are not segregated to distinct components or component portions of an integrated circuit device. For example, a single component or component portion of an integrated circuit device could be adapted to perform the functionality of more than one block component of FIG. 1B. Alternatively, components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) are useable in various examples.

Figure 2A:
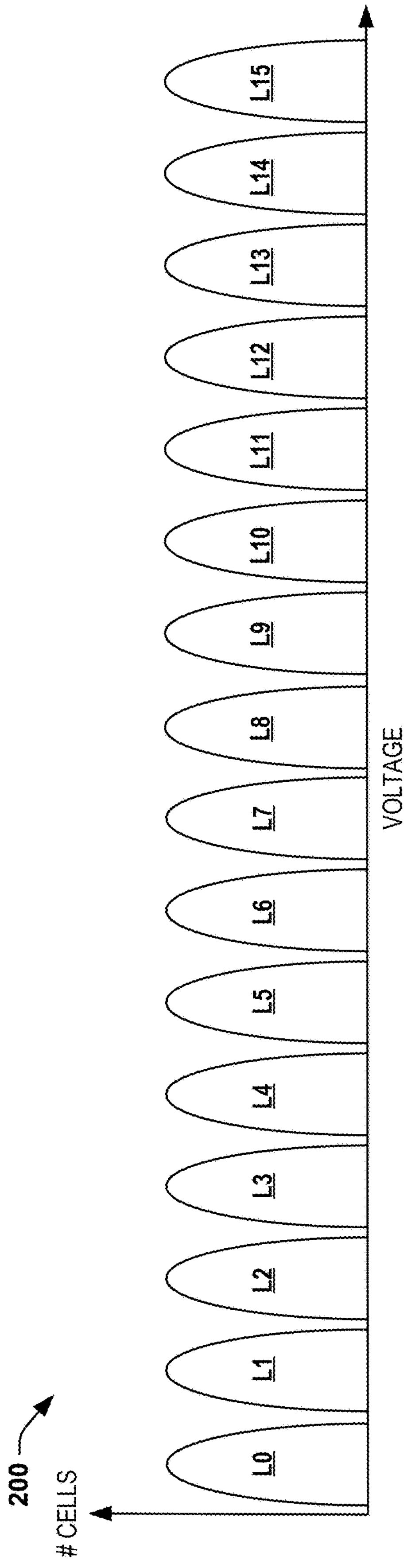
FIG. 2A illustrates an example diagram of voltage graphs for reading data.

FIG. 2A illustrates an example diagram of a voltage graph 200 for reading data. As an example, the voltage graph 200 can correspond to read voltage levels (e.g., threshold voltages) for reading encoded data (codewords) from memory cells of the memory device 130 over a quantity of memory cells to be read. The read voltage levels can correspond to programmed states of the array of memory cells 104 of the memory device 130. The example shown in FIG. 2A represents four-bit, e.g., sixteen-state, memory cells. Therefore, the voltage levels represent sixteen target states to which the memory cells can be programmed. In the example of FIG. 2A, the sixteen target states are labeled zero through fifteen (L0-L15). Each of the voltage levels includes a four-bit binary code corresponding to the respective voltage level. The example of FIG. 2A is not limited to the non-consecutive four-bit binary codes demonstrated, but could instead each be any of a variety of different binary values. In the example of FIG. 2A, the voltage levels are demonstrated as approximately uniform with respect to the quantity of memory cells.

As described above, every time a block 106 of the memory device 130 is read, a high amplitude read voltage pulse is applied to the block 106. Over a large quantity of read operations, the high amplitude read pulses can result in RD stress and RDCL, each of which can deleteriously affect read performances of the memory cells 104. For example, RD stress can alter the voltage thresholds of the memory cells, thereby resulting in a greater error rate in the data that is read from the memory cells. RD stress can be exhibited based on the voltages of lower voltage levels (e.g., voltage levels 0 and/or 1) shifting to a higher amplitude. As another example, RDCL can result in distortion and decrease of charge distributions of voltage thresholds at higher voltage levels (e.g., voltage levels 14 and/or 15) shifting to a lower amplitude resulting from charge loss. Such shifts in voltage threshold amplitudes can cause bit errors during a read operation of the respective memory cell 104.

Figure 2B:
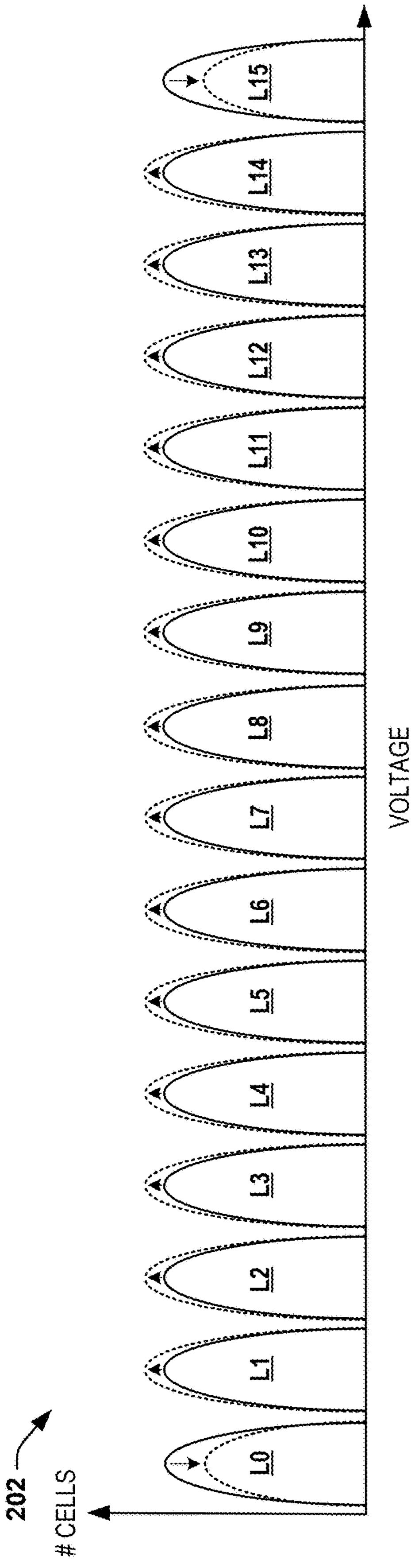
FIG. 2B illustrates another example diagram of voltage graphs for reading data.

FIG. 2B illustrates another example diagram of a voltage graph 202 for reading data. Similar to as described above for the graph 200, the voltage graph 200 can correspond to read voltage levels (e.g., threshold voltages) for reading encoded data (codewords) from memory cells of the memory device 130 over a quantity of memory cells to be read. The example shown in FIG. 2B represents four-bit, e.g., sixteen-state, memory cells, representing sixteen target states to which the memory cells can be programmed. In the example of FIG. 2B, the sixteen target states are labeled zero through fifteen (L0-L15), with each of the voltage levels including a four-bit binary code corresponding to the respective voltage level. The example of FIG. 2B is not limited to the non-consecutive four-bit binary codes demonstrated, but could instead each be any of a variety of different binary values.

The graph 202 in example of FIG. 2B can correspond to a modified version of the graph 200 as a result of bit shaping of the associated codeword. The graph 202 demonstrates the levels in a solid line, which is the same as the graph 200 in the example of FIG. 2A, and the levels in a dotted line corresponding to the voltage levels of the bit-shaped codeword of which the graph 202 is representative. Thus, while the voltage graph 200 in the example of FIG. 2A demonstrated uniformity with respect to the quantity of memory cells in each of the voltage levels, the graph 202 is demonstrated as non-uniform. In the example of FIG. 2B, the first voltage level (L0, having a value 1111) and the sixteenth voltage level (L15, having a value 1011) are demonstrated as reduced regarding the quantity of memory cells relative to the graph 200. Because the quantity of memory cells in the first and sixteenth is reduced, the quantity of memory cells is demonstrated in the example of FIG. 2B as having increased in each of the voltage levels therebetween.

Because RD stress affects the lowest voltage levels of a codeword and RDCL affects the highest voltage levels of a codeword, the shaped codeword represented by the graph 202 can be resistant to the effects of RD stress and RDCL, respectively. Accordingly, bit-shaping can provide for a more robust storage of data in a memory device (e.g., the memory device 130) over time and/or over multiple read/write operations.

As an example, bit shaping can be implemented by flipping groups of bits of the user data (e.g., with such groups described as "windows") that satisfy a bit-shaping criterion. For example, a given codeword can be shaped by encoding the codeword to have fewer logic-1 values than logic-0 values. However, bit shaping is not limited to such criterion, and a variety of other bit-shaping criteria can instead be implemented. A bit-shaping algorithm can thus be implemented to evaluate each of the windows of the data and to flip the bits of the window if the window satisfies the criterion. The flipping of the windows can be identified by flip indicator data that can provide information as to which of the windows have been flipped prior to the encoding process for shaping the codeword. The flip indicator data can likewise be encoded as part of the shaped codeword.

However, parity data is generated by the encoding process subsequent to the implementation of the bit-shaping algorithm. Therefore, parity data is generated after the shaped data is encoded, and is thus not shaped by the same bit-shaping algorithm as the user data and flip indicator data. Because parity data is not shaped, the parity data may not follow the same criteria to provide the bit shaping as the user data (and flip indicator data), and can thus negatively affect the quantity of memory cells in the voltage levels to counteract the shaping of the user data. As a result, a codeword with unshaped parity data can be more susceptible to RD stress and RDCL.

As described herein, the parity data that is generated for shaped encoded data can also be shaped subsequent to the encoding of the user data to provide for a shaped codeword that can be more resilient to the effects of RD stress and/or RDCL. After the shaped data is encoded, the parity data can be shaped by a modified operation of the bit-shaping algorithm. As an example, the bit-shaping algorithm can evaluate the parity bits of each of the block columns of the associated identity matrix (e.g., of a quasi-cyclic encoding process) of the parity data to determine if the parity bits satisfy a bit-shaping criterion. For example, the bit-shaping criterion can be the same as or similar to the bit-shaping criterion that was implemented to shape the data of the codeword. Thus, in response to determining if layers of the parity bits of the block columns satisfy the bit-shaping criterion, the bit-shaping algorithm can flip the parity bits of the block column. In response to flipping all of the block columns that satisfy the bit-shaping criterion, the parity data can likewise be shaped and appended to the shaped data to provide the resultant shaped codeword. The shaped codeword can thus be saved to the memory device, and can be more resilient to the effects of RD stress and/or RDCL relative to unshaped codewords (e.g., having uniform voltage levels like the codeword represented by the graph 200).

Figure 3:
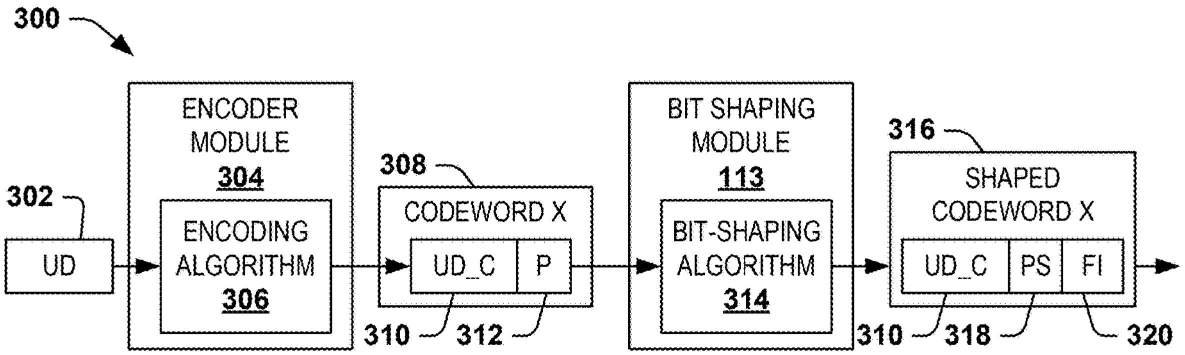
FIG. 3 illustrates an example block diagram of a data write operation.

FIG. 3 illustrates an example block diagram 300 of encoding data. The block diagram 300 demonstrates a high-level process of the encoding a codeword of data to provide a shaped codeword. In the diagram 300, user data ("UD") 302 is provided to an encoder module 304 to be encoded by an encoding algorithm 306. The encoding algorithm 306 can be any of a variety of encoding algorithms, such as implementing an LDPC code. The encoding algorithm 306 generates parity data that can be later implemented for decoding the resultant codeword. In the example of FIG. 3, a codeword 308 is output from the encoder module 304. The codeword 308 is demonstrated as "CODEWORD X" being output from the encoder module 304. The letter "X" can denote that the codeword 308 can be one of a plurality of codewords, and is denoted as having an index X.

The codeword 308 includes encoded user data ("UD_C") 310 and parity data ("P") 312. As an example, the encoded user data 310 can be shaped prior to operation of the encoding algorithm 306, such that the encoded user data 310 can also include shaped flip indicator data. However, even if the codeword 308 includes shaped (encoded) user data 310, the parity data 312 output from the encoder module 304 is not shaped, and can undesirably affect the voltage levels of the codeword 308 as stored in the memory device 130.

The codeword 308 is thus provided to the bit-shaping module 113 to be shaped by a bit-shaping algorithm 314. For example, the bit-shaping algorithm 314 can provide bit-shaping of the parity data 312 after implementation of the encoder algorithm 306. As an example, the bit-shaping algorithm 314 can be configured to evaluate groups (e.g., windows) of bits of the parity data 312 to determine whether the groups of bits satisfy a bit-shaping criterion. As an example, the bit-shaping criterion can be to have fewer logic-1 values than logic-0 values. Therefore, if a given window of parity bits of the parity data 312 satisfies the bit-shaping criterion, the bit-shaping algorithm 314 flips the bits in the window. The resulting parity data 312 can thus be shaped to affect the voltage levels of the resultant codeword.

In addition, the bit-shaping algorithm 314 can generate flip indicator data that provides information as to which of the windows of bits of the parity data 312 have been flipped. In the example of FIG. 3, the bit-shaping algorithm 314 generates a shaped codeword 316 that includes the encoded user data ("UD_C") 310, which may have been shaped prior to encoding, shaped parity data 318 corresponding to the parity data 312 having one or more flipped windows of bits, and flip indicator data ("FI") 320 that is indicative of the flipped windows of the shaped parity data 318. As an example, the flip indicator data 320 can correspond to a single asserted (e.g., logic-1) bit for each of the flipped windows of the parity data 312 to form the shaped parity data 318. The shaped codeword 316 is demonstrated as "SHAPED CODEWORD X" being output from the bit-shaping algorithm 314 of the bit-shaping module 113, and thus corresponding to the Xth codeword 308. The shaped codeword 316 can thus be saved to the memory device 130.

FIG. 4 illustrates an example of a decoder module 400. The decoder module 400 can be included in the memory sub-system controller 115, such as with the encoder module 304. In response to the encoding of the codeword 308, the decoder module 400 can be configured to generate a linear block code matrix ("LINEAR BLOCK CODE MATRIX X") 402 corresponding to the shaped codeword 316 (the Xth shaped codeword). As an example, the linear block code matrix 402 can correspond to an H-matrix that can be implemented to decode the codeword 308 via the parity data 312. However, because the parity data 312 was shaped by the bit-shaping algorithm 314 subsequent to the encoding procedure implemented by the encoding algorithm 306, the linear block code matrix 402 does not account for the shaping that was implemented by the bit-shaping algorithm 314.

Figure 4A:
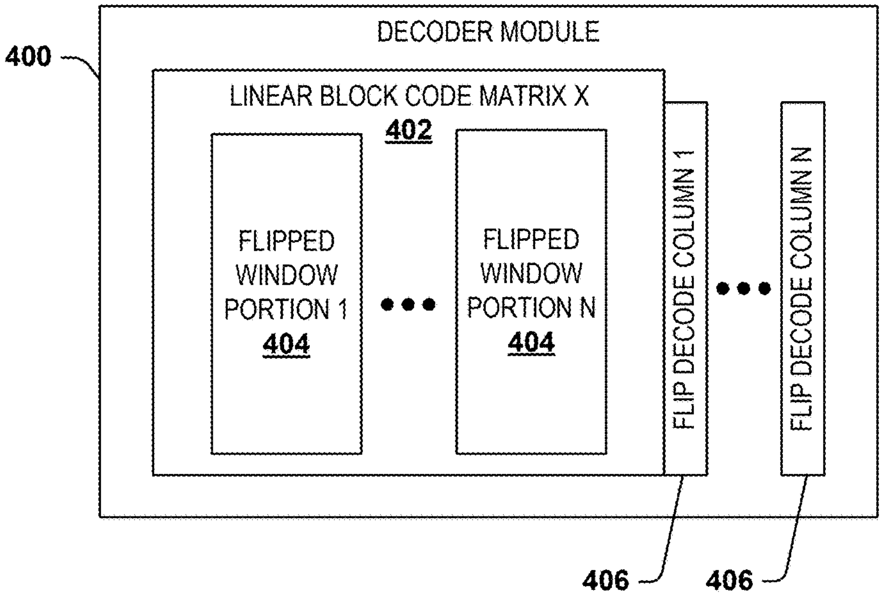
FIG. 4A illustrates an example diagram of a decoder module.

In the example of FIG. 4A, the linear block code matrix 402 includes a plurality N of flipped window portions 404 that correspond to respective windows of the shaped codeword 316 that were flipped by the bit-shaping algorithm 314, where N is a positive integer greater than zero. The flipped window portions 404 may not be changed in response to the flipping of the windows of the parity data 312 to generate the shaped parity data 318, but can instead be merely identified by the decoder module 400 as being relevant to the bit-shaping of the parity data 312 during operation of the bit-shaping algorithm 314. For example, similar to the communication between the encoder module 304 and the decoder module 400 to allow decoding of the codeword 308, the bit-shaping module 113 can also communicate with the linear block code matrix 402 to allow recovery of the parity data 312 from the shaped parity data 318.

In response to determining which of the windows of the parity data 312 were flipped by the bit-shaping algorithm 314, and thus determining which of the portions of the linear block code matrix 402 correspond to the respective windows, the decoder module 400 can generate flip decode data. The flip decode data is demonstrated in the example of FIG. 4A as a plurality N of flip decode columns 406, with each of the flip decode columns 406 corresponding to a respective one of the flipped window portions 404. The flip decode columns 406 can each provide bit-error protection for each of the respective bits of the flip indicator data 320. For example, similar to the encoded user data 310 and the shaped parity data 318, the flip indicator data 320 can be subject to bit errors when saved in and/or read from the memory device 130. Accordingly, the flip decode columns 406 can determine the validity of the flip indicator data 320 of the shaped codeword 316 after the shaped codeword 316 is read from the memory device 130.

For example, the flip decode columns 406 can each correspond to a logic operation of the bits of the respective corresponding one of the flipped window portions 404. As an example, the flip decode columns 406 can each have a plurality of rows that are each a single bit, with the plurality of rows having a quantity equal to the quantity of columns of each of the flipped window portions 404 of the linear block code matrix 402.

Figure 4B:
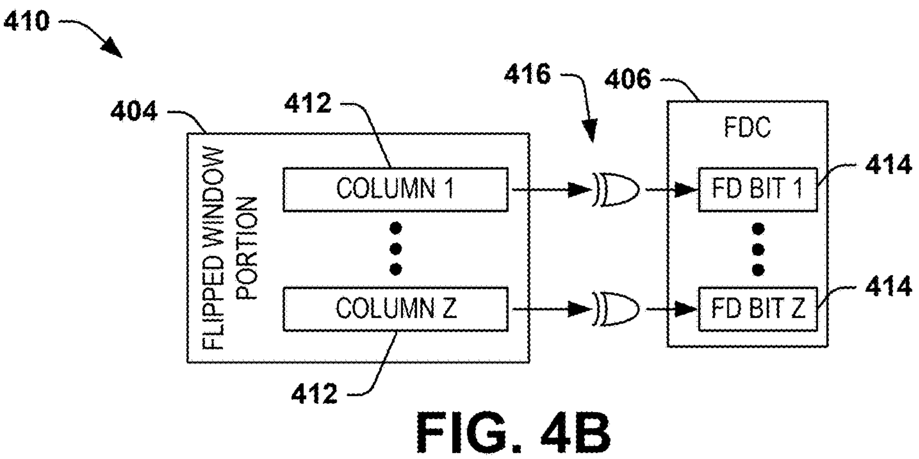
FIG. 4B illustrates an example diagram of generating flip decode data.

FIG. 4B illustrates an example diagram 410 of generating flip decode data. The diagram 410 demonstrates one of the flipped window portions 404 of the linear block code matrix 402 that includes a plurality Z of columns 412, where Z is a positive integer greater than zero. The diagram 410 also includes a corresponding one of the flip decode columns ("FDC") 406. The flip decode column 406 includes a plurality Z of flip decode bits ("FD BIT") 414. The flip decode bits 414 are arranged in the example of FIG. 4B as single-bit rows having a quantity Z equal to the quantity Z of the columns 412. Each of the flip decode bits 414 is demonstrated as being generated based on a logic-XOR operation, demonstrated generally at 416, performed on all of the bits of a given one of the columns 412 of the flipped window portion 404.

Therefore, the validity of the respective corresponding bit of the flip indicator data 320 can be determined based on the logic-state of the respective bit of the flip indicator data 320 read from the memory device 130 relative to the logic-states of the flip decode bits 414 of the respective flip decode column 406. Accordingly, the decoder module 400 can determine if the flip indicator data 320 is correct, or if the flip indicator data 320 includes one or more bit-errors. In case of an error, typical decoding can process the shaped codeword 316 since it is part of the codebook created by linear block code 402 and flip decode columns 406. As a result, the decoder module 400 can then decode the encoded user data 310 based on the linear block code matrix 402, including the flip decode columns 406 (e.g., via an LDPC decoding algorithm).

Figure 5:
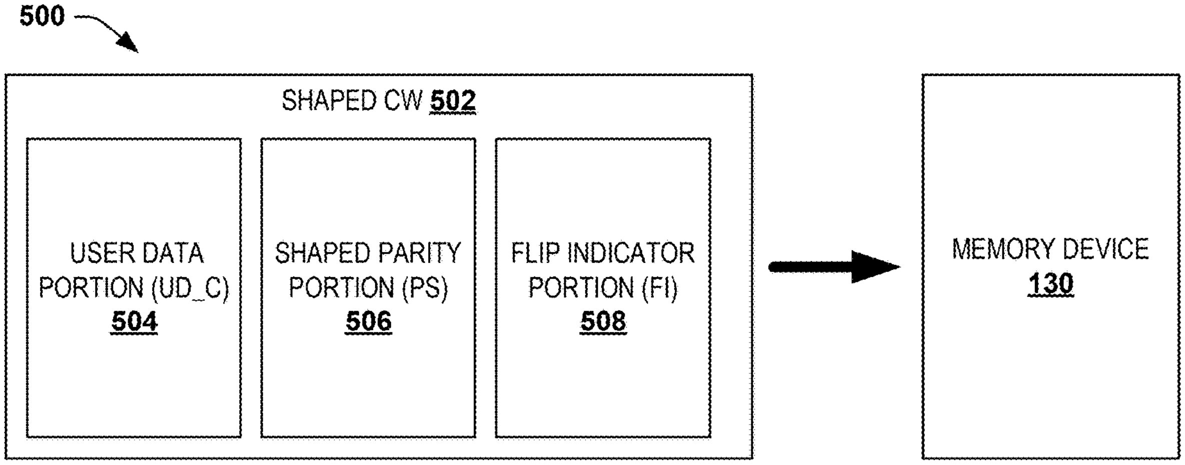
FIG. 5 illustrates another example diagram of a data write operation.

FIG. 5 illustrates an example diagram 500 of a data write operation. The diagram 500 includes a shaped codeword ("SHAPED CW") 502 being provided to the memory device 130. The shaped codeword 502 includes an encoded user data ("UD_C") 504 (which may or may not have been shaped prior to encoding), a shaped parity data ("PS") 506, and a flip indicator data ("FI") 508. As an example, the encoded user data 504 can correspond to the encoded user data 310, the shaped parity data 506 can correspond to the shaped parity data 318, and the flip indicator data 508 can correspond to the flip indicator data 320, as described above in the examples of FIGS. 4A and 4B. The shaped codeword 502 can thus be stored in the memory device 130 to provide the shaped voltage levels with respect to the quantity of memory cells, such as described above in the example of FIG. 2B, to mitigate the effects of RD stress and/or RDCL.

Figure 6:
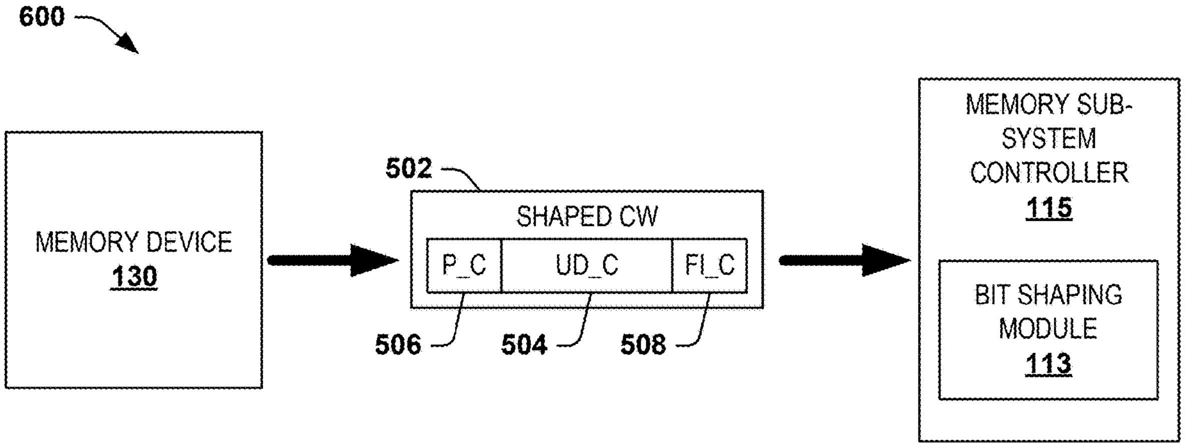
FIG. 6 illustrates an example diagram of a data read operation.

FIG. 6 illustrates an example diagram 600 of a data read operation. The data read operation can correspond to the shaped codeword 502 being subsequently read from the memory device 130. Storage of the shaped codeword 502 and access of the shaped codeword 502 from the memory device 130 can result in bit errors of the shaped codeword 502, and thus the encoded user data 504 within. Therefore, the shaped codeword 502 is provided to the memory sub-system controller 115 to implement a decoding process that can correct the bit errors of the shaped codeword 502 (such as via an LDPC decoding algorithm).

To decode the shaped codeword 502, the bit-shaping module 113 can validate the encoded flip indicator data 508 based on the flip decode data 406. The bit-shaping module 113 can thus correct any of the flip indicator bits of the flip indicator data 508 in response to determining any errors in the flip indicator data 508. The memory sub-system controller 115 can thus decode the shaped codeword 502 via a typical decoding process (e.g., LDPC decoding).

Figure 7:
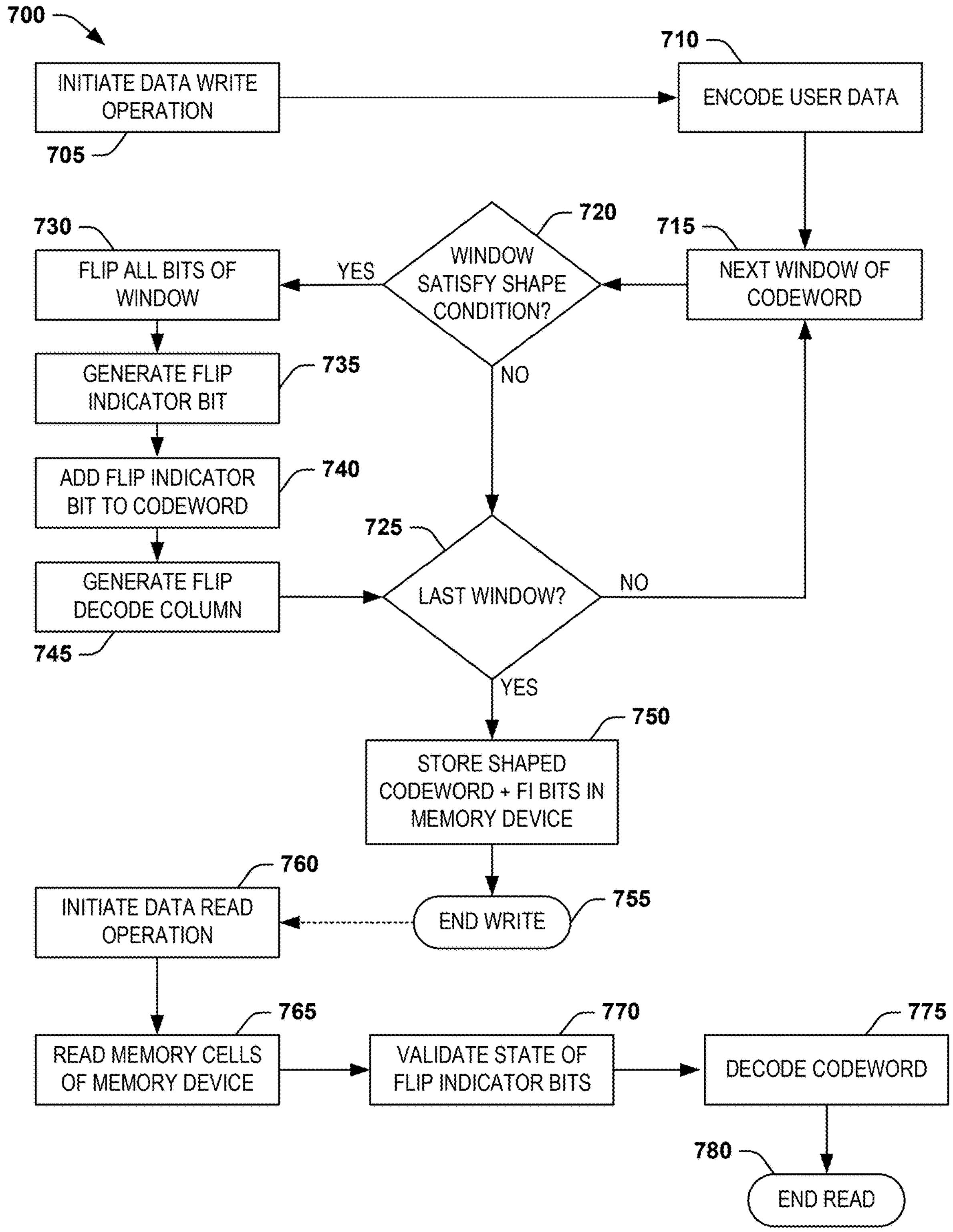
FIG. 7 illustrates an example flow diagram of a method for bit-shaping a codeword for a memory device.

FIG. 7 illustrates a flow diagram of a method 700 for bit-shaping a codeword for a memory device (e.g., the memory device 130). While the above description relates mostly to bit-shaping parity data, the method 700 demonstrates a manner of bit-shaping any portion(s) of a codeword, and is thus not limited to parity data. The method 700 can be implemented, for example, by a controller, such as the memory sub-system controller 115 (e.g., including the bit-shaping module 113, the encoder module 304, and the decoder module 400) of the system 100 of FIG. 1A. The method 700 can thus correspond to operation of the parity data recovery process described herein. The method begins at 705, in which the controller initiates a data write operation. The method 700 then proceeds to 710.

At 710, the controller encodes user data to generate a codeword (e.g., the codeword 308) that includes encoded user data and parity data. The method 700 then proceeds to 715, at which a next window of bits of the codeword is selected. If the method 700 arrives at 715 from 710, then the next window is the first window of the codeword. The method then proceeds to 720.

At 720, a determination is made as to whether the selected window of the codeword satisfies a bit-shaping condition. For example, the bit-shaping condition can be that a given window includes more logic-1 values than logic-0 values. If the determination at 720 is negative (e.g., NO), and thus the window does not satisfy the bit-shaping condition, the bit-shaping module 113 does not flip the bits of the selected window. The method 700 proceeds to 725. If the determination at 720 is positive (e.g., YES), and thus the window does satisfy the bit-shaping condition, then the method 700 proceeds to 730.

At 730, reached if the determination at 720 is positive, the bit-shaping module 113 flips all of the bits of the selected window. The method then proceeds to 735. At 735, the bit-shaping module 113 generates a flip indicator bit (e.g., as part of flip indicator data) that can be asserted to indicate that the selected window was flipped. The method then proceeds to 740, at which the flip indicator bit is added (e.g., appended) to the codeword. Then method then proceeds to 745, at which the decoder module (e.g., the decoder module 400) generates a flip decode column that corresponds to the selected window that was flipped at 730. The flip decode column is generated offline, and the window length of the flipped window can be set to be determinative of which columns of the block code matrix are provided a logic-XOR operation to generate the repsective flip decode column. The flip decode column can thus provide bit-error protection for the flip indicator bit that was generated at 735. The method then proceeds to 725.

At 725, a determination is made as to whether the selected window is the last window of the codeword. The evaluation of whether the selected window is the last can be determined by a specific subset of windows for which bit-shaping is to be applied, or can be based on evaluation of all windows of the codeword. If the determination at 725 is negative (e.g., NO), and thus that there are additional windows of the codeword to evaluate for bit-shaping, then the method 700 proceeds back to 715. Therefore, the next window is evaluated to determine whether or not to flip the bits of the respective window for bit-shaping the codeword. If the determination at 720 is positive (e.g., YES), and thus the respective window is the last window, then the method 700 proceeds to 750.

At 750, the shaped codeword and the associated flip indicator bits (e.g., collectively forming the flip indicator data) is stored in the memory device 130. The method 700 then proceeds to 755, at which the data write operation concludes.

At a subsequent time, the shaped codeword can be read from the memory device 130. At 760, arrived to at a subsequent time demonstrated by the dotted line, the memory sub-system controller 115 initiates a data read operation. The method 700 proceeds to 765, at which voltages of the memory cells of the memory device 130 are read to read the shaped codeword from the memory device 130. As described above, storage of the shaped codeword in the memory device 130 and/or readout of the shaped codeword from the memory device 130 can result in bit-errors. The bit-errors can affect the encoded user data, the parity data, and the flip indicator data. The method 700 then proceeds to 770.

At 770, the memory sub-system controller 115 (e.g., the decoder module 400) validates the state of each of the respective flip indicator bits of the flip indicator data. To validate the flip indicator bits, the decoder module 400 can compare the state of the flip indicator bits of the shaped codeword read from the memory device 130 with the logic states of the flip decode columns 406. The decoder module 400 can thus determine which, if any, of the flip indicator bits have bit errors, and can thus correct the respective bit-errors of the flip indicator bits accordingly. The method 700 then proceeds to 775. At 775, the decoder module 400 decodes the codeword based on the parity data and the linear block code matrix 402. The method 700 then proceeds to 780, at which the read operation, and thus the method 700, concludes.

Figure 8:
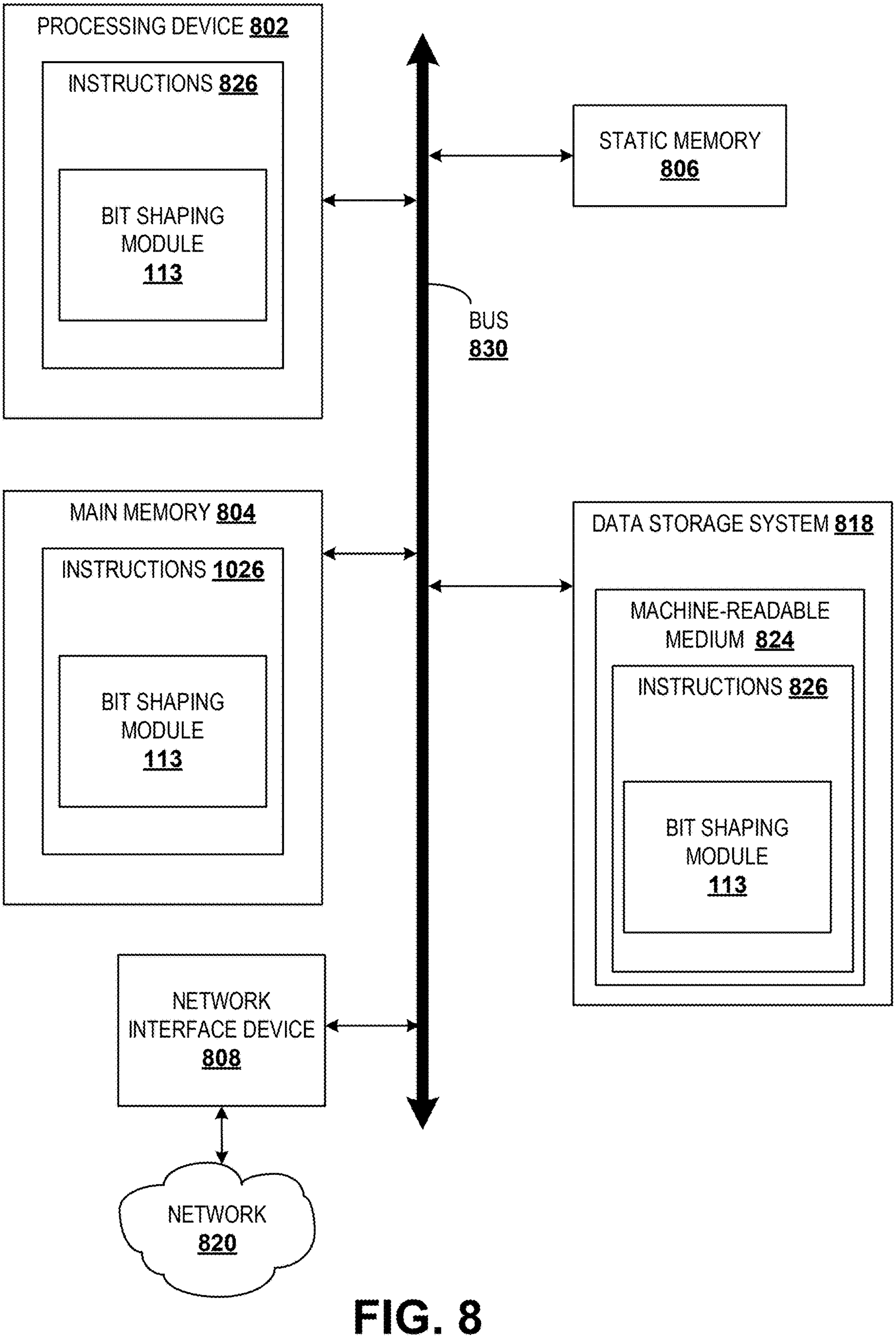
FIG. 8 illustrates an example of a computer system in which examples of the present description may operate.

FIG. 8 illustrates an example machine of a computer system 800 (a machine) within which a set of instructions, for causing the machine to perform any one or more of the methodologies discussed herein, can be executed. In some examples, the computer system 800 corresponds to a host system (e.g., the host system 120 of FIG. 1A) that includes, is coupled to, or utilizes a memory sub-system (e.g., the memory sub-system 110 of FIG. 1A) or is used to perform the operations of a controller (e.g., to execute an operating system to perform operations corresponding to the bit-shaping module 113 of FIG. 1A). In other examples, the machine is connected (e.g., networked) to other machines in a LAN, an intranet, an extranet and/or the Internet. In various examples, the machine operates in the capacity of a server or a client machine in client-server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automotive application, a data center, a smart factory, or other industrial application. Further, while a single machine is illustrated, the term "machine" shall also be taken to include any collection of machines that individually or jointly execute a set (or multiple sets) of instructions to perform the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM) or other non-transitory computer-readable media) and a data storage system 818, which communicate with each other via a bus 830.

The processing device 802 represents one or more general-purpose processing devices such as a microprocessor, a central processing unit, etc. More particularly, the processing device 802 can be a complex instruction set computing (CISC) microprocessor, reduced instruction set computing (RISC) microprocessor, very long instruction word (VLIW)

microprocessor or a processor implementing other instruction sets or processors implementing a combination of instruction sets. In some examples, the processing device 802 is implemented with a special-purpose processing devices such as an application specific integrated circuit (ASIC), a field programmable gate array (FPGA), a digital signal processor (DSP), network processor, etc. The processing device 802 is configured to execute instructions 826 for performing the operations discussed herein. In some examples, the computer system 800 includes a network interface device 808 to communicate over the network 820.

The data storage system 818 includes a machine-readable storage medium 824 (also known as a computer-readable medium) that store sets of instructions 826 or software for executing the methodologies and/or functions described herein. The machine-readable storage medium 824 is a non-transitory medium. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818 and/or main memory 804 can correspond to the memory sub-system 110 of FIG. 1A. Accordingly, the machine-readable storage medium 824, the data storage system 818 and/or the main memory 804 are examples of non-transitory computer-readable media.

In some examples, the instructions 826 include instructions to implement functionality corresponding to the bit-shaping module 113 of FIG. 1A. As an example, the instructions can include implementing a bit-shaping algorithm 314 to shape a codeword (e.g., parity data of the codeword) after the encoding process by flipping windows of the codeword, and implementing an algorithm to remove the bit-shaping by un-flipping the windows of the codeword based on validated flip indicator data. While the machine-readable storage medium 824 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system or similar electronic computing device that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on"means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for bit-shaping data of a codeword for a memory device, the method comprising:

flipping bits in one or more data windows of the codeword to provide one or more respective flipped data windows based on a shaping criterion to shape the codeword via a controller;

generating a flip indicator bit via the controller to indicate each of the one or more flipped data windows of the shaped codeword;

appending the flip indicator bit for each of the one or more flipped data windows to the shaped codeword via the controller;

generating a flip decode data column for each of the one or more flipped data windows by executing a logic-XOR operation on columns of a linear block code decoding matrix that are indexed to bit positions of the respective flipped data window within the codeword, wherein the linear block code decoding matrix is a binary matrix having a number of columns equal to a number of bit positions of the codeword, and the linear block code decoding matrix is stored in the controller; and storing the shaped codeword with the appended flip indicator bit for each of the one or more flipped data windows in the memory device via the controller in a data write operation, such that a logic state of the flip indicator bit for each of the one or more flipped data windows is protected from errors based on the flip decode data column.

2. The method of claim 1, wherein flipping the bits in the one or more data windows comprises flipping parity bits in one or more parity data windows of parity data of the codeword to provide one or more respective flipped parity data windows based on the shaping criterion to shape the codeword.

3. The method of claim 2, further comprising:

reading the shaped codeword from the memory device;

validating the flip indicator bit of each of the one or more flipped data windows of the parity data based on the flip decode data column and the linear block code decoding matrix; and correcting the flip indicator bit of any of the one or more flipped data windows of the parity data in response to determining an error of the respective flip indicator bit.

4. The method of claim 3, further comprising decoding the codeword based on the flipped data windows of the parity data and the linear block code matrix.

5. The method of claim 2, wherein the codeword is a partially-shaped codeword comprising bit-shaped user data and flip indicator data associated with the bit-shaped user data, wherein flipping the parity bits comprises flipping the parity bits in the one or more parity data windows of the partially-shaped codeword to further shape the partially-shaped codeword.

6. The method of claim 1, wherein the shaped codeword has a reduced quantity of memory cells in a lowest voltage level and in a highest voltage level relative to remaining voltage levels of the shaped codeword.

7. A system for bit-shaping data of a codeword for a memory device, comprising:

the memory device; and a processing device coupled to the memory device, the processing device to perform operations comprising:

flipping bits in one or more data windows of the codeword to provide one or more respective flipped data windows based on a shaping criterion to shape the codeword;

generating a flip indicator bit to indicate each of the one or more flipped data windows of the shaped codeword;

appending the flip indicator bit for each of the one or more flipped data windows to the shaped codeword;

generating a flip decode data column for each of the one or more flipped data windows by executing a logic-XOR operation on columns of a linear block code decoding matrix that are indexed to bit positions of the respective flipped data window within the codeword, wherein the linear block code decoding matrix is a binary matrix having a number of columns equal to a number of bit positions of the codeword, and the linear block code decoding matrix is stored in the processing device; and storing the shaped codeword with the appended flip indicator bit for each of the one or more flipped data windows in the memory device in a data write operation, wherein a logic state of the flip indicator bit for each of the one or more flipped data windows is protected from errors based on the flip decode data column.

8. The system of claim 7, wherein flipping the bits in the one or more data windows comprises flipping parity bits in one or more parity data windows of parity data of the codeword to provide one or more respective flipped parity data windows based on the shaping criterion to shape the codeword.

9. The system of claim 8, further comprising:

reading the shaped codeword from the memory device;

validating the flip indicator bit of each of the one or more flipped data windows of the parity data based on the flip decode data column and the linear block code decoding matrix; and correcting the flip indicator bit of any of the one or more flipped data windows of the parity data in response to determining an error of the respective flip indicator bit.

10. The system of claim 8, wherein the codeword is a partially-shaped codeword comprising bit-shaped user data and flip indicator data associated with the bit-shaped user data, wherein flipping the parity bits comprises flipping the parity bits in the one or more parity data windows of the partially-shaped codeword to further shape the partially-shaped codeword.

11. A non-transitory computer-readable storage medium comprising instructions that, when executed by a processing device, cause the processing device to perform bit-shaping of a codeword for a memory device, the instructions comprising:

flipping bits in one or more data windows of the codeword to provide one or more respective flipped data windows based on a shaping criterion to shape the codeword;

generating a flip indicator bit to indicate each of the one or more flipped data windows of the shaped codeword;

appending the flip indicator bit for each of the one or more flipped data windows to the shaped codeword;

generating a flip decode data column for each of the one or more flipped data windows by executing a logic-XOR operation on columns of a linear block code decoding matrix that are indexed to bit positions of the respective flipped data window within the codeword, wherein the linear block code decoding matrix is a binary matrix having a number of columns equal to a number of bit positions of the codeword, and the linear block code decoding matrix is stored in the processing device; and storing the shaped codeword with the appended flip indicator bit for each of the one or more flipped data windows in the memory device in a data write operation, wherein a logic state of the flip indicator bit for each of the one or more flipped data windows is protected from errors based on the flip decode data column.

12. The medium of claim 11, wherein flipping the bits in the one or more data windows comprises flipping parity bits in one or more parity data windows of parity data of the codeword to provide one or more respective flipped parity data windows based on the shaping criterion to shape the codeword.

13. The medium of claim 12, further comprising:

reading the shaped codeword from the memory device;

validating the flip indicator bit of each of the one or more flipped data windows of the parity data based on the flip decode data column and the linear block code decoding matrix; and correcting the flip indicator bit of any of the one or more flipped data windows of the parity data in response to determining an error of the respective flip indicator bit.

14. The medium of claim 12, wherein the codeword is a partially-shaped codeword comprising bit-shaped user data and flip indicator data associated with the bit-shaped user data, wherein flipping the parity bits comprises flipping the parity bits in the one or more parity data windows of the partially-shaped codeword to further shape the partially-shaped codeword.

* * * * *